8507X
A. D. Lord,
Washing Machine,
Patented Nov. 24, 1834.
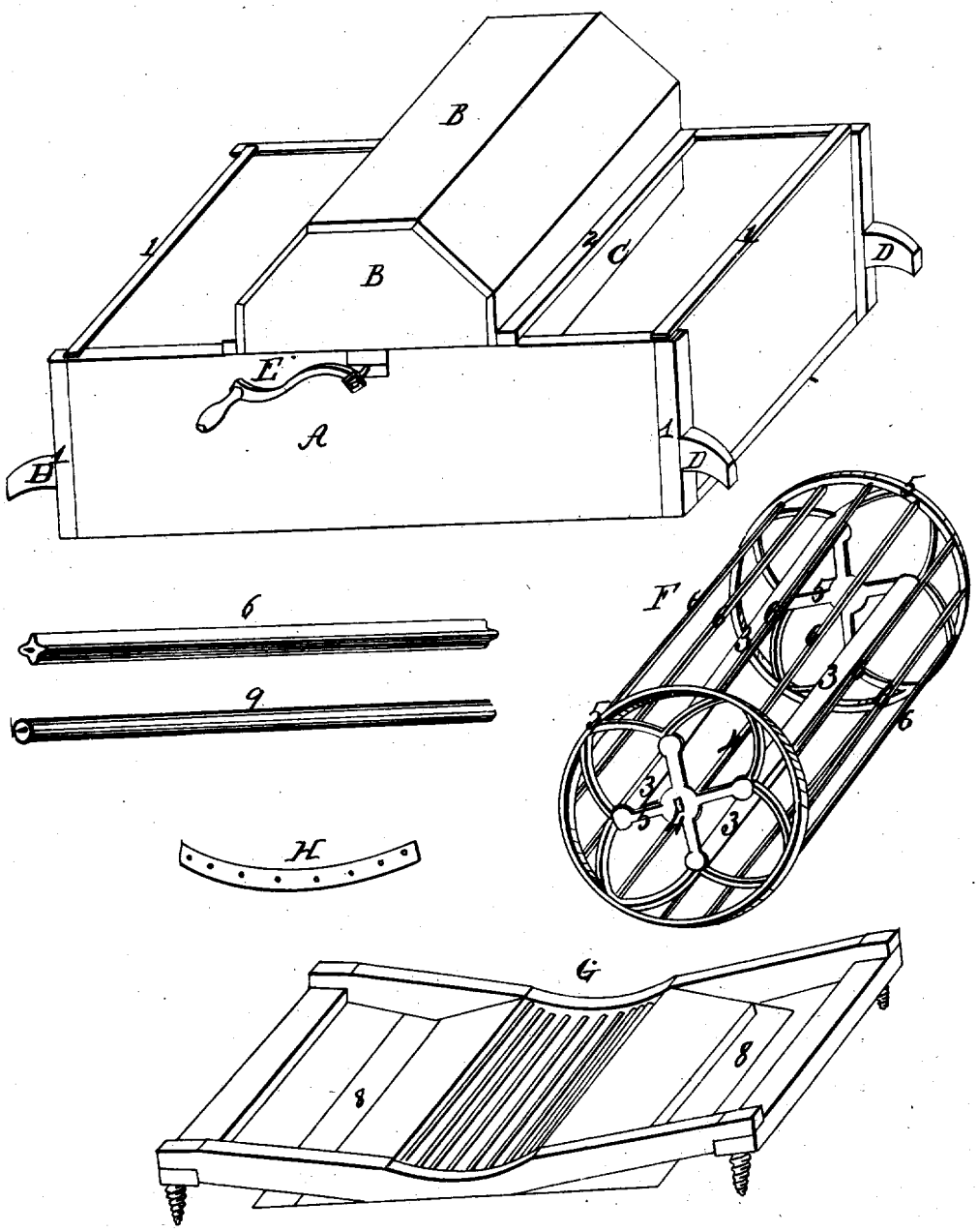
N. PETERS, PHOTO-LITHOGRAPHER, WASHINGTON, D. C.

Alanson D. Ford
Letters Patent

The Schedule referred to in these Letters Patent and making part
of the same containing a description in the words of the said Alanson
D. Ford himself of his improvement in a washing machine which
was patented to George A. Stocking September the 10 of 1829.
To all to whom these presents shall come. Be it known
that I Alanson D. Ford of Bethany in the County of Gene-
see and State of New York have invented a new and useful improve-
ment in a washing machine and that the following is a full and
exact description of the construction and operation of the said machine
as invented or improved by me. A represents the box which is
made of pine or other suitable timber the common size of which is
three feet four inches long by one foot six inches wide and ten inches
deep grooved together and set in paint. The ends are grooved
into the sides and bottom and an Iron band around each end
to hold the same in place represented by No 1. Also two braces
that cross the box each side of the cap to keep the box from spread-
ing and to hold the cap in its place represented by No 2. B rep-
resents the cap which is formed of seven pieces and made in
an eight square form. There is also a lip put on the inside of
said cap that passes down by the joint to keep the water from run-
ning out. C represents a part of said cap running down into
the box to keep the suds from flying out at the ends of the ma-
chine. D represents the handles. E the crank. F represents
the cylinder the heads or ends thereof composed of cast iron brass or
any other kind of metal. said heads are in the form of wheels and
are drilled to receive the pivots of the rollers and supported with four
rounds passing from one wheel to the other to keep them equal dis-
tances apart and to prevent the cylinder from swinging or twist-
ing which are represented by No 3. Said rounds pass through
the arms of said wheels half way from the center to the rim by
means Drawing means of holes cast through the same. A square rod of iron passes throug the centre of said cylinder that serves for the gudgeons represented by No 4, which comes through the box to receive the crank. No 5 represents the wheel. No 6 represents the fluted rollers of the cylinder G. represents the spring board which is set with eight rollers which run on iron pivots and said pivots in straps of cast iron brass, or any other kind of metal and made in a circular form represented by letter H. said spring board is composed of eight pieces of timber two cross pieces at each end to receive the springs and to keep said spring board from spreading and hold the same to its place. Also two pieces that cross each side of the rollers called aprons to guide the clothes directly under the cylinder to which I have added a joint that one part may lay tight on the bottom of the box to prevent the clothes from getting under said spring boards. The pieces added are represented by No 8. The side pieces to be made crooked so as to admit of springs at each corner which gives a gentle pressure on the clothes. No 9. represents a round or reeded roller for the spring board.
The box to be made of inch stuff pine, cherry or other suitable timber, which may be set on a frame or bench. The cylinder may be of any size from ten to twenty four inches in diameter and the rollers increased from ten to twenty four in number as may be required for light or heavy washing. The spring board may have from eight to twelve rollers. the rollers may be from three fourth to one and a fourth of an inch in diameter. the rollers of the cylinder from one and a fourth to two inches in diameter according to the size of the machine the box to be increased or decreased accordingly.
All that is claimed to be new or invented by me is the cast iron or brass cylinder. The box bound with iron. the ends grooved into the bottom. the joint in the apron of the spring board. the braces that run across the box to keep it from spreading. the caps made in an eight square form. a spring that holds the boxes down that the gudgeons run in and the gudgeons run-
ning ning one half inch below the top of the box, and a lip inside of the cap to keep the water from running out of the joint; and a frame or bench to set the machine on, also four small springs to keep a part of the apron down on the bottom of the box which prevents the clothes from getting under the concave and working up between the rollers. The clothes are entoud at either end of the box and place directly between the two set of rollers and then turning the cylinder round draws the clothes directly under the centre of the cylinder. there they can be held or drawn back without the least injury whilst the cylinder is turned round. This method of operation is perfectly easy on any garment. As the garment prepes between two set of rollers it avoids the common friction which is usual in washing and will not wear clothes as much as the ordinary way. In witness whereof I have hereunto set my name this 5th day of September 1834

Witnesses
Ira Wait
Nason Blood

Alanson [illegible] Lord 1040 ros